(12) United States Patent
Avrutsky et al.

(10) Patent No.: US 8,957,544 B2
(45) Date of Patent: Feb. 17, 2015

(54) SYSTEMS AND METHODS TO OPTIMIZE OUTPUTS OF STATIC INVERTERS IN VARIABLE ENERGY GENERATION ENVIRONMENTS

(75) Inventors: Mordechay Avrutsky, Alfei Menashe (IL); Dan Kikinis, Saratoga, CA (US)

(73) Assignee: Tigo Energy, Inc., Los Gatos, CA (US)

( * ) Notice: Subject to any disclaimer, the term of this patent is extended or adjusted under 35 U.S.C. 154(b) by 786 days.

(21) Appl. No.: 13/157,016

(22) Filed: Jun. 9, 2011

(65) Prior Publication Data

US 2011/0304204 A1 Dec. 15, 2011

Related U.S. Application Data

(60) Provisional application No. 61/397,320, filed on Jun. 9, 2010.

(51) Int. Cl.
*H02J 1/10* (2006.01)
*H02M 7/48* (2006.01)
*H02M 1/42* (2007.01)

(52) U.S. Cl.
CPC *H02M 7/48* (2013.01); *H02M 1/42* (2013.01); *Y02B 70/12* (2013.01)
USPC .......................................................... 307/25

(58) Field of Classification Search
USPC .......................................................... 307/25
See application file for complete search history.

(56) References Cited

U.S. PATENT DOCUMENTS

| 4,384,321 | A | 5/1983 | Rippel |
|---|---|---|---|
| 5,155,670 | A | 10/1992 | Brian |
| 5,235,266 | A | 8/1993 | Schaffrin |
| 5,268,832 | A | 12/1993 | Kandatsu |
| 5,604,430 | A | 2/1997 | Decker et al. |
| 5,923,158 | A | 7/1999 | Kurokami et al. |
| 6,275,016 | B1 | 8/2001 | Ivanov |
| 6,448,489 | B2 | 9/2002 | Kimura et al. |
| 6,650,031 | B1 | 11/2003 | Goldack |
| 6,844,739 | B2 | 1/2005 | Kasai et al. |
| 6,894,911 | B2 | 5/2005 | Telefus et al. |
| 6,984,970 | B2 | 1/2006 | Capel |
| 7,061,214 | B2 | 6/2006 | Mayega |
| 7,248,946 | B2 | 7/2007 | Bashaw et al. |
| 7,256,566 | B2 | 8/2007 | Bhavaraju et al. |

(Continued)

FOREIGN PATENT DOCUMENTS

| AU | 2005262278 | 7/2005 |
|---|---|---|
| DE | 4232356 | 3/1994 |

(Continued)

OTHER PUBLICATIONS

International Patent Application No. PCT/US2010/029929, International Search Report and Written Opinion, Oct. 27, 2010.

(Continued)

*Primary Examiner* — Hal Kaplan
(74) *Attorney, Agent, or Firm* — Greenberg Traurig LLP

(57) ABSTRACT

A system to collect energy from generation systems such as, for example, wind farms or solar farms with distributed energy-generation equipment. The energy is collected and transmitted to a feed-in site. At the feed-in site, static inverters alone or in combination with pulse width modulation inverters may be used to feed the energy to a power grid. In some other cases, back-to-back static inverters create a high-voltage direct current to feed a transmission line.

20 Claims, 9 Drawing Sheets

(56) References Cited

U.S. PATENT DOCUMENTS

| | | | |
|---|---|---|---|
| 7,276,886 | B2 | 10/2007 | Kinder |
| 7,505,833 | B2* | 3/2009 | Delmerico et al. ........... 700/291 |
| 7,518,346 | B2 | 4/2009 | Prexl |
| 7,595,616 | B2 | 9/2009 | Prexl |
| 7,605,498 | B2 | 10/2009 | Ledenev et al. |
| 7,609,049 | B1 | 10/2009 | Tian et al. |
| 7,719,140 | B2 | 5/2010 | Ledenev et al. |
| 7,808,126 | B2* | 10/2010 | Stiesdal ......................... 307/84 |
| 8,090,548 | B2* | 1/2012 | Abdennadher et al. ......... 702/58 |
| 8,212,408 | B2 | 7/2012 | Fishman |
| 2002/0109585 | A1 | 8/2002 | Sanderson |
| 2003/0085621 | A1 | 5/2003 | Potega |
| 2005/0057214 | A1 | 3/2005 | Matan |
| 2005/0057215 | A1 | 3/2005 | Matan |
| 2006/0001406 | A1 | 1/2006 | Matan |
| 2006/0174939 | A1 | 8/2006 | Matan |
| 2006/0185727 | A1 | 8/2006 | Matan |
| 2007/0059986 | A1 | 3/2007 | Rockwell |
| 2007/0228838 | A1 | 10/2007 | Delmerico et al. |
| 2007/0273351 | A1 | 11/2007 | Matan |
| 2008/0106241 | A1 | 5/2008 | Deaver et al. |
| 2008/0121272 | A1 | 5/2008 | Besser et al. |
| 2008/0122449 | A1 | 5/2008 | Besser et al. |
| 2008/0122518 | A1 | 5/2008 | Besser et al. |
| 2008/0172312 | A1 | 7/2008 | Synesiou et al. |
| 2008/0179949 | A1 | 7/2008 | Besser et al. |
| 2008/0191560 | A1 | 8/2008 | Besser et al. |
| 2008/0191675 | A1 | 8/2008 | Besser et al. |
| 2008/0224629 | A1 | 9/2008 | Melanson |
| 2008/0303503 | A1 | 12/2008 | Wolfs |
| 2009/0096211 | A1 | 4/2009 | Stiesdal |
| 2009/0112493 | A1 | 4/2009 | Abdennadher et al. |
| 2009/0128102 | A1 | 5/2009 | Thorvaldsson |
| 2009/0189456 | A1 | 7/2009 | Skutt |
| 2009/0283129 | A1 | 11/2009 | Foss |
| 2010/0327657 | A1 | 12/2010 | Kuran |
| 2010/0332047 | A1 | 12/2010 | Arditi |
| 2011/0304213 | A1 | 12/2011 | Avrutsky et al. |
| 2011/0304215 | A1 | 12/2011 | Avrutsky et al. |
| 2013/0094262 | A1 | 4/2013 | Avrutsky |

FOREIGN PATENT DOCUMENTS

| | | |
|---|---|---|
| DE | 19961705 | 7/2001 |
| EP | 169673 | 1/1986 |
| EP | 1388774 | 2/2004 |
| ES | 2249147 | 3/2006 |
| WO | 03012569 | 2/2003 |

OTHER PUBLICATIONS

Alonso, R. et al., "A New Distributed Converter Interface for PV Panels," 20th European Photovoltaic Solar Energy Conference, Barcelona, Spain, pp. 2288-2291, Jun. 6-10, 2005.

Alonso, R. et al., "Experimental Results of Intelligent PV Module for Grid-Connected PV Systems," 21st European Photovoltaic Solar Energy Conference, Dresden, Germany, pp. 2297-2300, Sep. 4-8, 2006.

Basso, Tim, "IEEE Standard for Interrconnecting Distributed Resources With the Electric Power System," IEEE PES Meeting, Jun. 9, 2004.

Boostbuck.com, "The Four Boostbuck Topologies," located at http://www.boostbuck.com/TheFourTopologies.html, 2003.

Enslin, Johan H.R., et al., "Integrated Photovoltaic Maximum Power Point Tracking Converter," IEEE Transactions on Industrial Electronices, vol. 44, No. 6, pp. 769-773, Dec. 1997.

Gautam, Nalin K. et al., "An Efficient Algorithm to Simulate the Electrical Performance of Solar Photovoltaic Arrays," Energy, vol. 27, No. 4, pp. 347-361, 2002.

Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.

Nordmann, T. et al., "Performance of PV Systems Under Real Conditions," European Workshop on Life Cycle Analysis and Recycling of Solar Modules, The "Waste" Challenge, Brussels, Belgium, Mar. 18-19, 2004.

Palma, L. et al., "A Modular Fuel Cell, Modular DC-DC Converter Concept for High Performance and Enhanced Reliability," 38th IEEE Power Electronics Specialists Conference (PESC'07), pp. 2633-2638, Jun. 17, 2007.

Quaschning, V. et al., "Cost Effectiveness of Shadow Tolerant Photovoltaic Systems," Euronsun 96, pp. 819-824, Sep. 16, 1996.

Roman, Eduardo, et al., "Intelligent PV Module for Grid-Connectred PV Systems," IEEE Transactions on Industrial Electronics, vol. 53, No. 4, pp. 1066-1073, Aug. 2006.

Uriarte, S. et al., "Energy Integrated Management System for PV Applications," 20th European Photovoltaic Solar Energy Conference, Jun. 6, 2005.

Walker, G. R. et al., "Cascaded DC-DC Converter Connection of Photovoltaic Modules," 33rd IEEE Power Electronics Specialists Conference (PESC'02), vol. 1, pp. 24-29, 2002.

Walker, Geoffrey R. et al., "Cascaded DC-DC Converter Connection of Photovoltaic Modules," IEEE Transactions on Power Electronics, vol. 19, No. 4, pp. 1130-1139, Jul. 2004.

* cited by examiner

The Six-Phase Star Circuit

US 8,957,544 B2

SYSTEMS AND METHODS TO OPTIMIZE OUTPUTS OF STATIC INVERTERS IN VARIABLE ENERGY GENERATION ENVIRONMENTS

RELATED APPLICATION

The present application claims the benefit of the filing date of U.S. Provisional Patent Application Ser. No. 61/397,320, entitled "System and Method for Use of Static Inverters in Variable Energy Generation Environments" and filed Jun. 9, 2010, the disclosure of which application is hereby incorporated by reference in its entirety.

COPYRIGHT NOTICE AND PERMISSION

A portion of the disclosure of this patent document contains material which is subject to copyright protection. The copyright owner has no objection to the facsimile reproduction by anyone of the patent document or the patent disclosure, as it appears in the patent and trademark office patent file or records, but otherwise reserves all copyright rights whatsoever.

FIELD OF TECHNOLOGY

At least some embodiments of the disclosure relates to static inverters in general and, more specifically but not limited to, the collection of energy from variable energy generation systems via static inverters.

BACKGROUND

In variable energy generation systems, such as wind, solar, and other opportunistic power generation systems, the amount of available energy at any given time is not known. Also, these systems are often physically distributed over a large area, thus creating a challenge for collecting the energy with minimum power losses.

BRIEF SUMMARY

Some embodiments of the disclosure are summarized in this section.

In one embodiment, a system is configured to collect energy from generation systems such as, for example, wind farms or solar farms with widely distributed energy-generation equipment. In one embodiment, static inverters are used to feed the energy into a power grid.

In one embodiment, a pulse width modulation is connected in parallel with a static inverter to correct the power factor of the output of the static inverter.

In one embodiment, back-to-back static inverters are used to create a high-voltage DC output for a DC transmission line to collect power from multiple generation sites into one feed-in site for the power grid.

These and other objects will become clear to those skilled in the art in view of the description of the best presently known mode of implementing the embodiments and the industrial applicability of the preferred embodiment as described herein and as illustrated in the figures of the drawings. The embodiments are illustrated by way of example and not limitation.

BRIEF DESCRIPTION OF THE DRAWINGS

The embodiments will be apparent from the following detailed description in conjunction with the appended figures of drawings, in which.

In the various figures of the drawings, like references are used to denote like or similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. As a result, this specification represents a disclosure of all possible combinations of features described herein, except that certain combinations are excluded by reasons of mutually exclusive relationships in features, where the mutual exclusiveness is either explicitly identified in this specification or is apparent from the description of the respective features.

Figure 1:
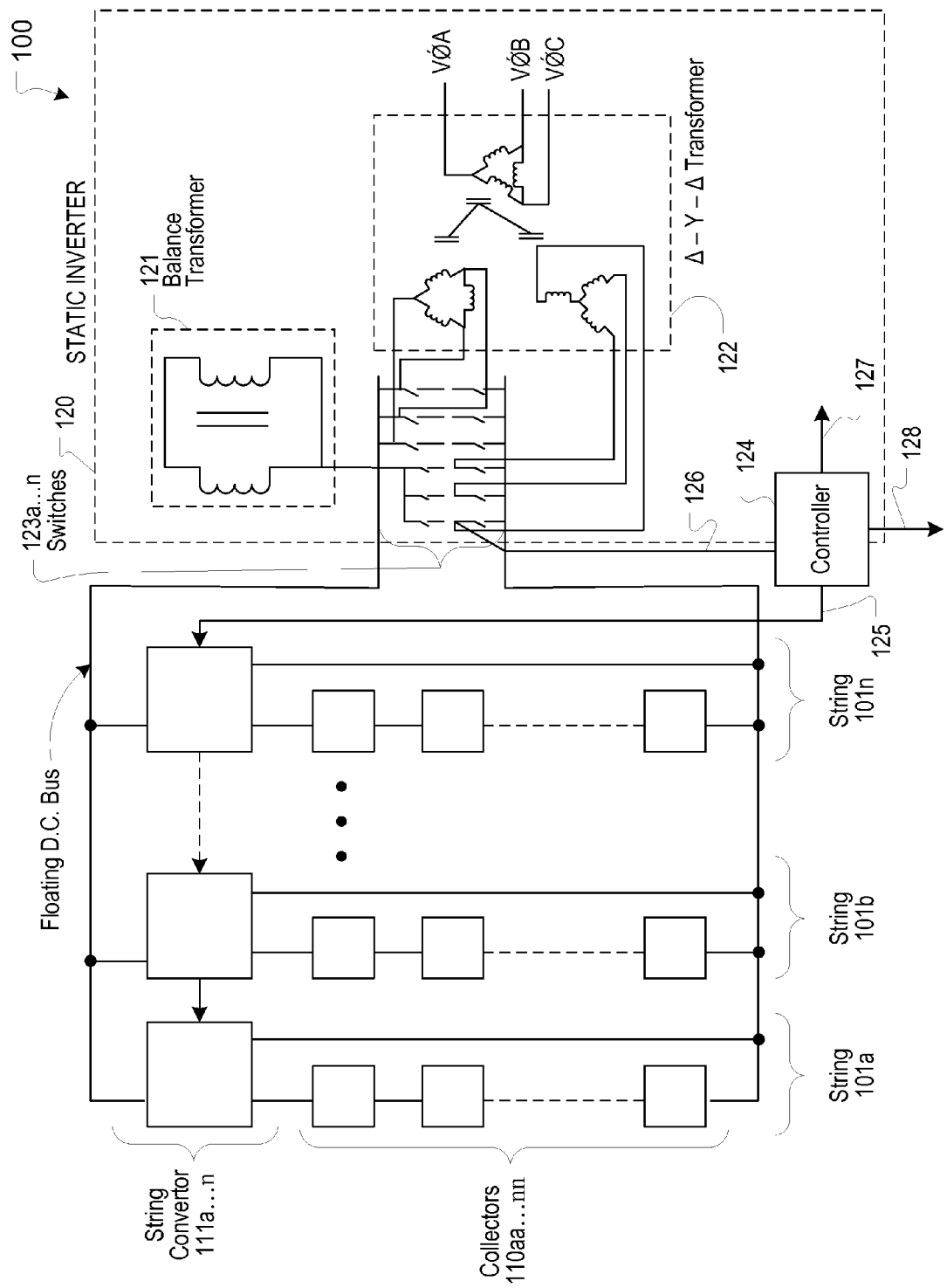
FIG. 1 shows an embodiment of a variable energy generation system with a static inverter.

FIG. 1 shows an overview of an exemplary multi-point power generation system 100, according to one embodiment. Shown are string sets 101a ... n, each equipped with a set of energy collecting units ("collectors") 110aa ... nn which output direct current (DC). Each string has a string converter 111a ... n that feeds high-voltage into a floating DC bus (e.g., floating relative the ground), typically, for example, in a range between 100 volts and 1000 volts. Some regulatory bodies place limits on the voltages, such as between 50 and 600 volts, in some cases as high as 1000 volts, but for purposes of this discussion, the actual values of these local regulatory limits are not important.

A static inverter is configured to transform the input voltage into the output voltage at a given ratio. Thus, an input voltage set at, for example, 500 volts, results in a specific AC power at a certain voltage. To feed properly into the grid, the voltage and the phase is adjusted. The phase can be adjusted by controlling the timing of the switches used in the static inverter. However, in normal operation, the voltage is not easily adjustable.

In the exemplary system 100 of FIG. 1, the string converters 111a . . . n are used to move the floating DC bus up or down according to the current energy production, so that static inverter 120 with its fixed ratio can generate the correct voltage to feed into the grid.

Static inverters have several properties that can be used for advantage, although in many situations, they also can be problematic. One of the advantages is that switching losses are substantially lower, as frequencies are much lower, generally (range of 50-400 Hz typically). The disadvantage is that transformers can be larger. In the case of solar installations the transformer is typically required for system sizes above a power rating of about 20 kW (as per today's pending regulations, but a limit will likely be in most cases) as a result of the need to have a galvanic isolation between the grid and the DC bus. A transformer is used because solar panels have leakage current at normal operating conditions, as do, in some cases, inverters. The larger the system, the larger and potentially more dangerous are such leakages.

Standard Pulse Width Modulation (PWM) inverters typically have additional filtering to avoid heating the transformer at the switching frequency, because such inverters are less efficient when driving a transformer directly. These losses are in addition to their switching losses.

The static inverters can be operated both ways, as converters and as rectifiers (hence inverter), and finally, they have a built-in ratio between input and output voltage that cannot be easily changed. In one embodiment, in the examples discussed herein, this problem is solved via the DC voltage bus that can be adjusted by primary inverters to provide the desired or needed voltage to feed into the grid. Lastly, when used to feed into the grid, the static inverters according to one embodiment have a power factor of typically 0.97 or even higher if a system with more than 12 pulses is used. The power factor can be adjusted as described below.

In one embodiment, the aforementioned generation of the correct voltage is done with the help of controller 124, which has connections 125 to the string converters, setting the voltage outputs they need to generate. Further, controller 124 controls switches 123a . . . n with appropriately insulated drivers (typically driver transformers or optically coupled switches, or both, or other suitable solutions) through control line 126 (drivers not shown). Said line 126 is shown here simplified as one line, whereas in reality, line 126 would contain at least a separate control line or pair for each switch, and each line would have a potential separator. Additionally, connection 127 connects to the grid to measure the voltage phase, to ensure that the voltage feed is correct. Also shown is data connection 128, which connection could connect via the Internet or some other public or private network to the electric utility, sending real-time data about energy being delivered, as well as to a supervisory site that could control multiple power generation sites.

Table 1, below, shows some aspects of a standard PWM inverter for solar application as compared to the new proposed system using a static inverter solution.

TABLE 1

| Parameter | Standard solution with PWM inverter | New proposed system using static inverter |
|---|---|---|
| Line transformer need | Mandatory above 20 kw | Mandatory above 20 kw, but likely always using a transformer |
| DC bus losses | At full rated load DC bus voltage is minimal yielding maximum losses at this point | DC bus voltage is at its maximum level at full rated load yielding lower conduction losses by 44% (out of the typical 1.3% of conduction losses |
| Reliability | Components switched at relatively high frequency | Low switching frequency. Inverter efficiency higher by more than 1% resulting in lower operation temperature. Aluminum electrolytic not required. |
| EMI | Mainly affected by switching frequency | Low frequency component only |
| Local MPPT for maximum energy harvesting | None | Full solution solving all mismatch conditions as result of thermal, aging, soiling initial tolerances, shade. |
| Price for local MPPT | Need separate AC inverter per each power segment | Local MPPT by simple stage and simple DC-AC inverter lowest price possible |
| Cooling | Need separate fans | Transformer and switches can operate with natural convection cooling. |

Figure 2:
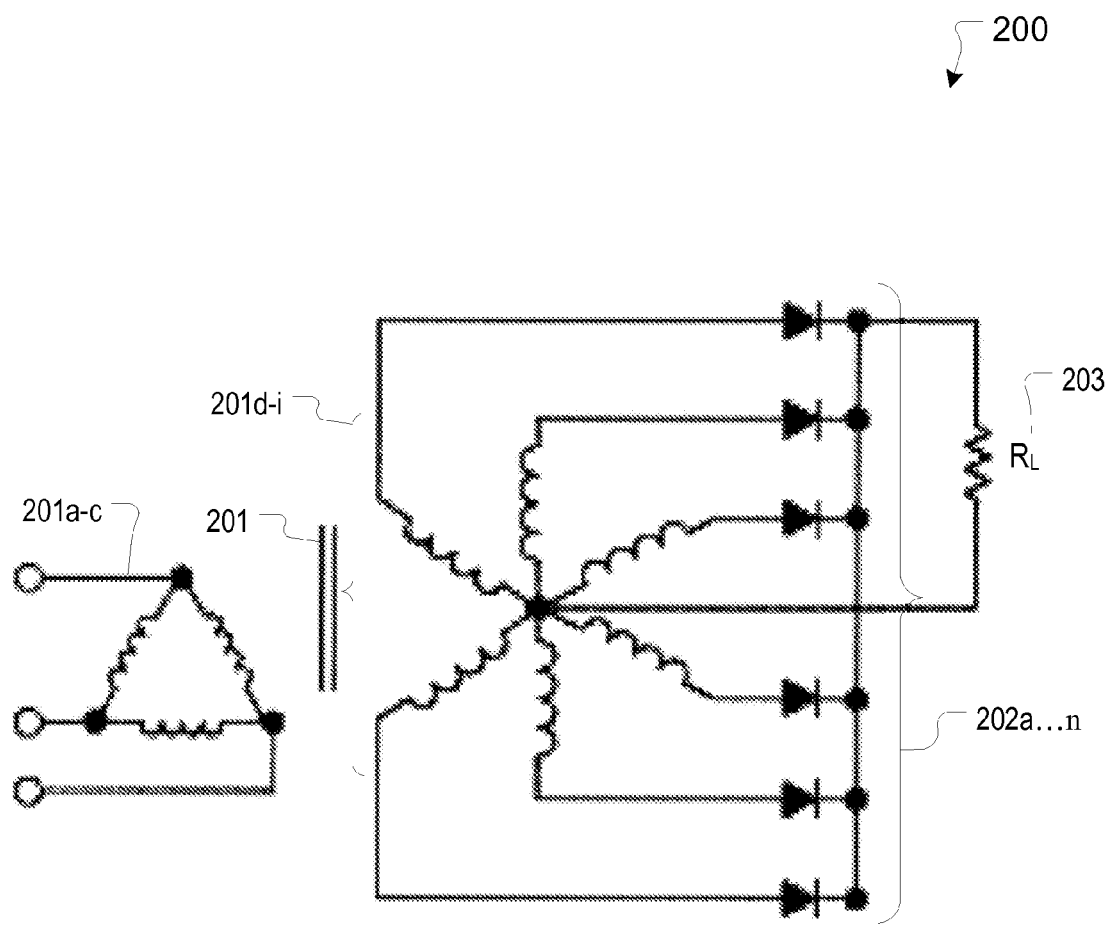
FIG. 2 shows a six-phase star circuit.

FIG. 2 shows another approach to using a static inverter, according to one aspect of the system described herein. In this approach, a six-phase star circuit 200 has, instead of diodes 202a . . . n shown in the figure, switches to generate the alternating current for the load 203. The advantage of such an approach is that only one switch is in series, hence reducing conduction losses. However the transformer 201 is more complicated, with additional windings 201d . . . i on one side (double wye), and a regular delta with three windings 201a . . . c on the other side (AC).

Figure 3A:
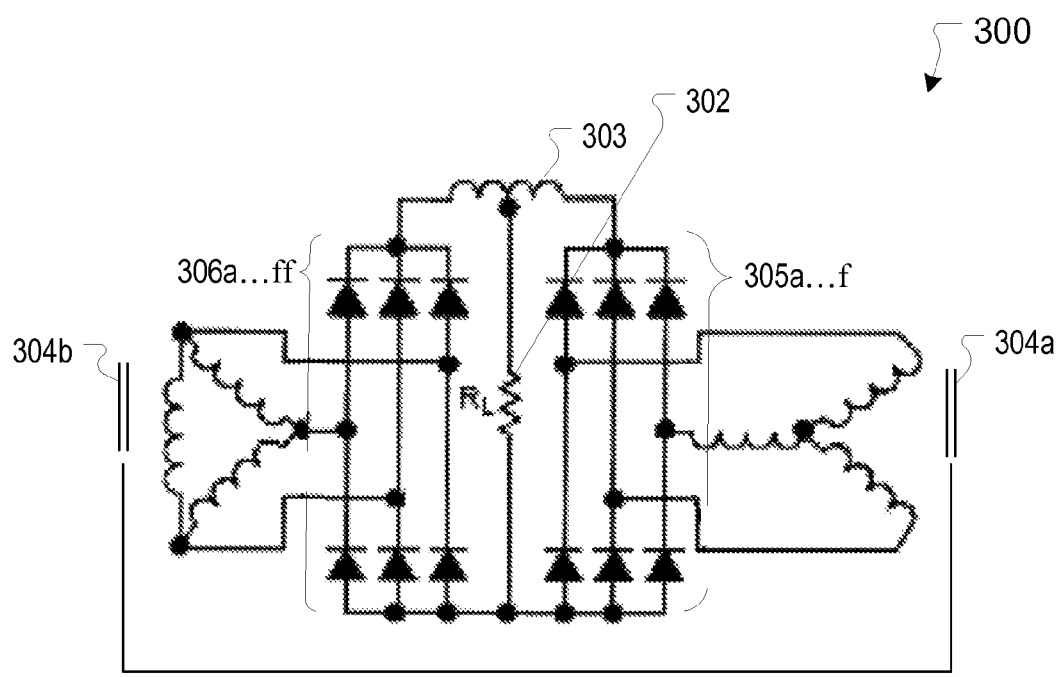
FIG. 3a shows a delta-wye type of transformer.

FIG. 3a shows a typical delta (304b)-wye (304a) type of transformer (ac winding not shown here) in static inverter or rectifier 300. In this example, diodes 305a . . . f and 306a . . . f are shown for operation in a rectifying mode, feeding through a balance transformer 303 into a load 302. In other cases, if the load is replaced with a DC bus and the diodes are replaced with switches such as, for example, FETs, SCRs, IGBTs etc., this topology could be used to both rectify or up-convert.

Figure 3B:
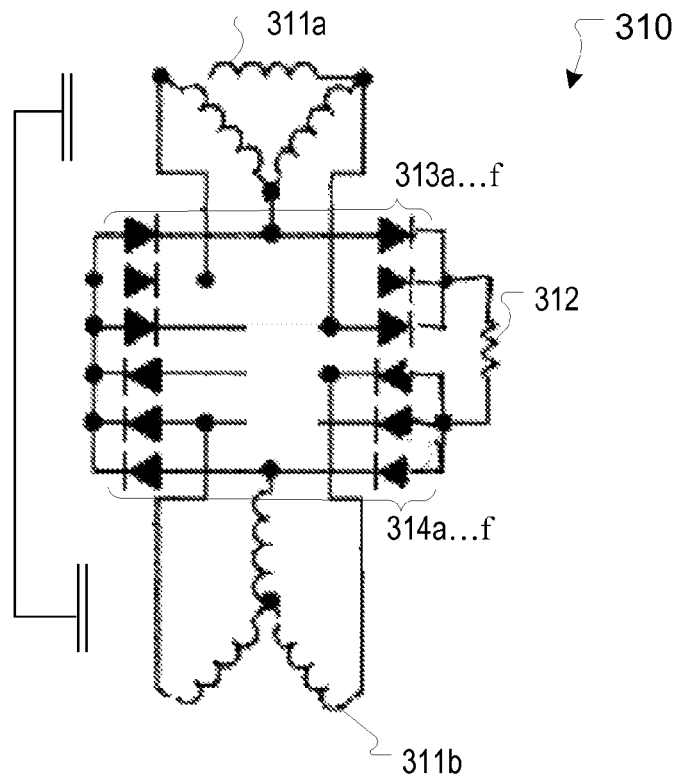
FIG. 3b shows an alternative design of a static inverter or rectifier according to one embodiment.

FIG. 3b shows an alternative design of static inverter or rectifier 310, according to another aspect of the system disclosed herein. Static inverter or rectifier 310 does not have balancing transformer 303. Shown are delta windings 311a and wye windings 311b. Also shown are the two sets of switches (as discussed above) or diodes 313a . . . f and 314a . . . f. The DC bus or load is resistor RL 312.

Figure 4A:
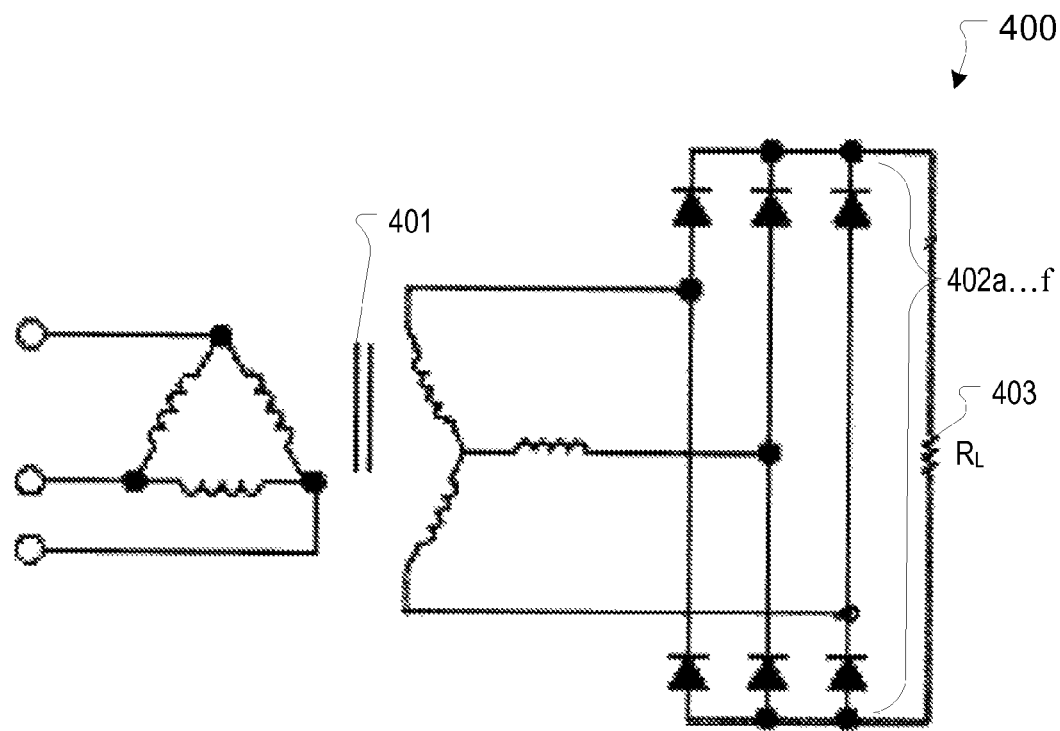
FIG. 4a shows another exemplary simplified static inverter or rectifier in a three-phase full-wave bridge circuit, according to one embodiment.

FIG. 4a shows another exemplary simplified static inverter or rectifier in three-phase full-wave bridge circuit 400, according to one aspect of the system disclosed herein. Circuit 400 is a 5-pulse type static inverter, characterized by a simpler transformer 401 (only three windings as a delta or wye on the switches side), as opposed to the 12-pulse static inverter or rectifier discussed in other sections that requires a total of six windings (typically as one set of three in a delta and another three in a wye). As a result, circuit 400 has a stronger ripple 411 (than a 12-pulse static inverter or rectifier would have), which can be seen in FIG. 4b. Diodes 402a . . . f are used for rectifiers, or switches would be used for static inverters. Controlled rectifiers or other suitable switches such as MOSFeT, IGBT, or even mercury valves may be used according to the voltage being handled. Also shown is the DC bus or DC load 403.

Figure 4B:
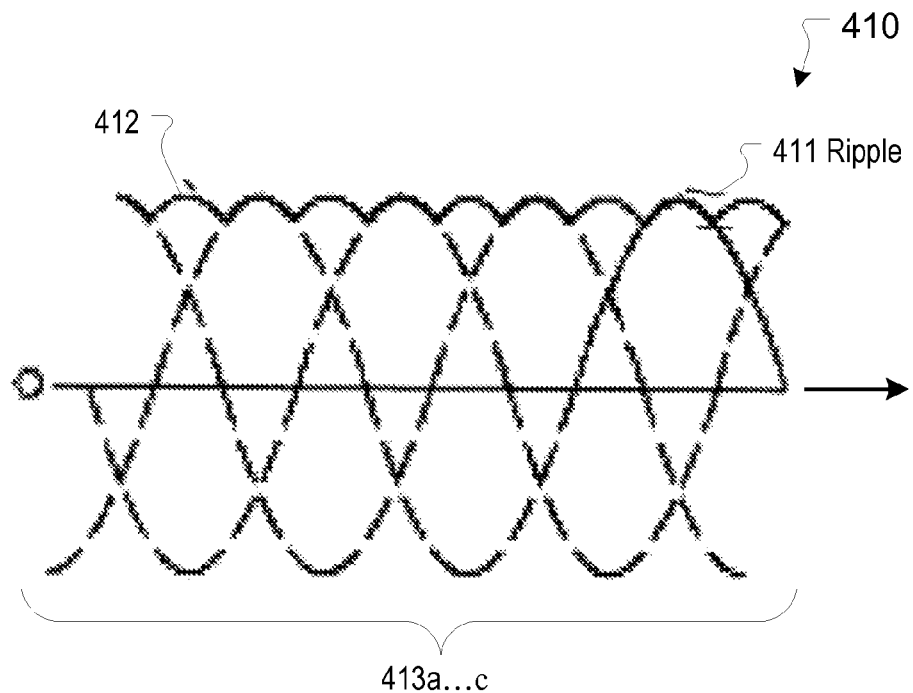
FIG. 4b shows voltage waveforms with output voltage and phase voltages.

FIG. 4*b* shows voltage waveforms 410, with output voltage 412 and phase voltages 413*a* . . . *c*.

Figure 5A:
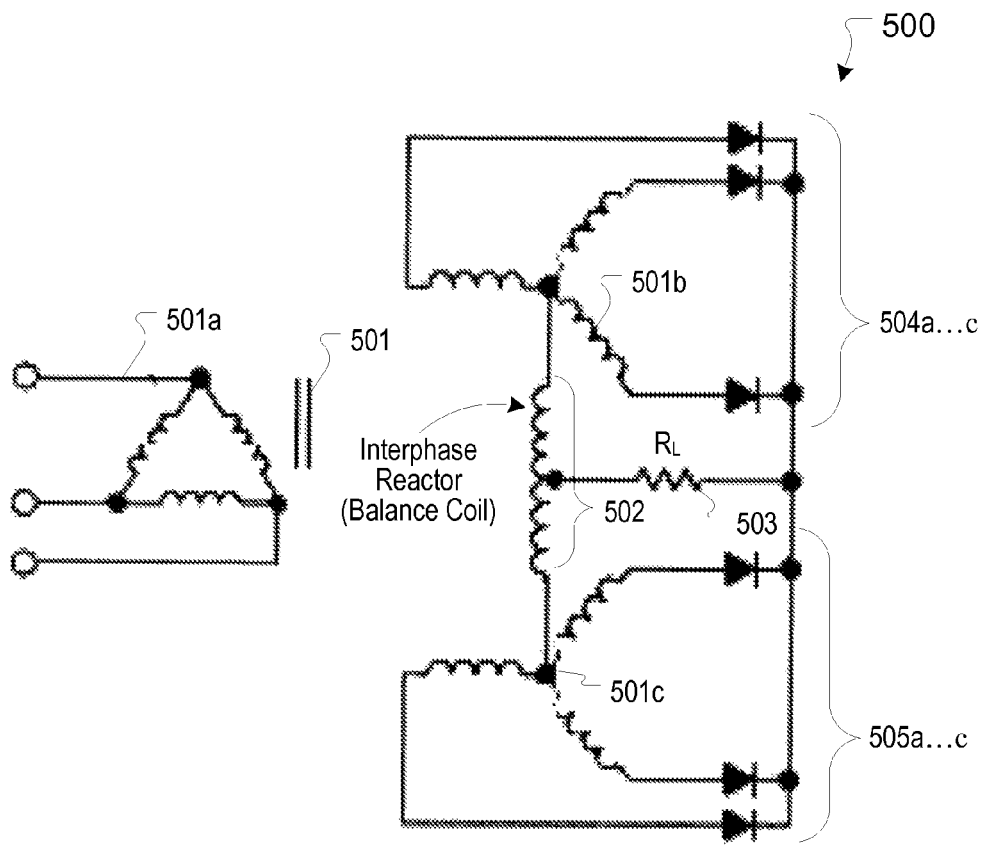
FIG. 5a shows a balanced inter-reactor system with a delta-wye-wye transformer and a balanced reactor on a separate core.

FIG. 5*a* shows a balanced inter-reactor system 500 with a delta-wye-wye transformer and a balanced reactor on a separate core. Transformer 501 has an AC side delta winding 501*a* and two primary windings 501*b* and 501*c*. Windings 501*b* and 501*c* have different winding ratios and/or phase assignments, thus supporting creation of a 12-pulse conversion static inverter or rectifier. Again, instead of standard rectifiers 504*a* . . . *c* and 505*a* . . . *c*, SCRs or other, suitable switching devices may be used. In FIG. 5*a*, the interface reactor (balance coil) 502 is connected to load 503.

Figure 5B:
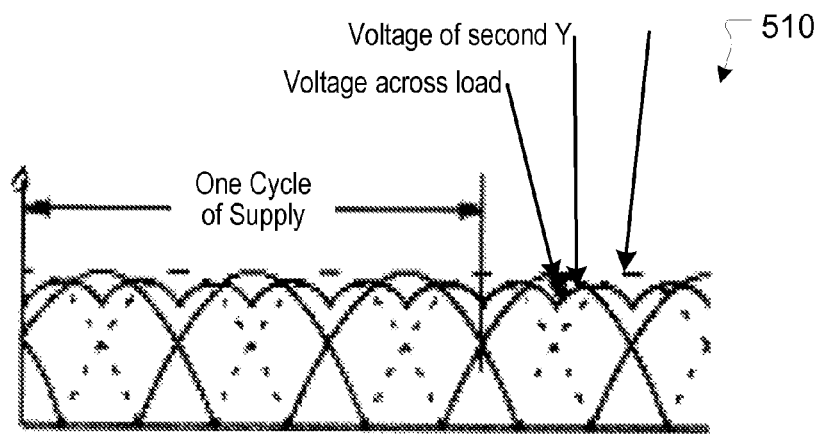
FIG. 5b shows waveforms that result from a 12-pulse approach.

FIG. 5*b* shows the waveforms 510 that result from a 12-pulse approach, instead of a 6-pulse approach. Voltages are overlaid such that a very small ripple results with less than 3 percent load factor. In many cases, using the 12 pulse approach is sufficient filtering for connection to a grid; however in other cases, additional correction may be required, as discussed below in the description of FIG. 7. Thus when operating from AC to DC, only minimal filter capacity needs to be added, or when operating the other way, minimal power factor correction needs to be done.

Figure 6A:
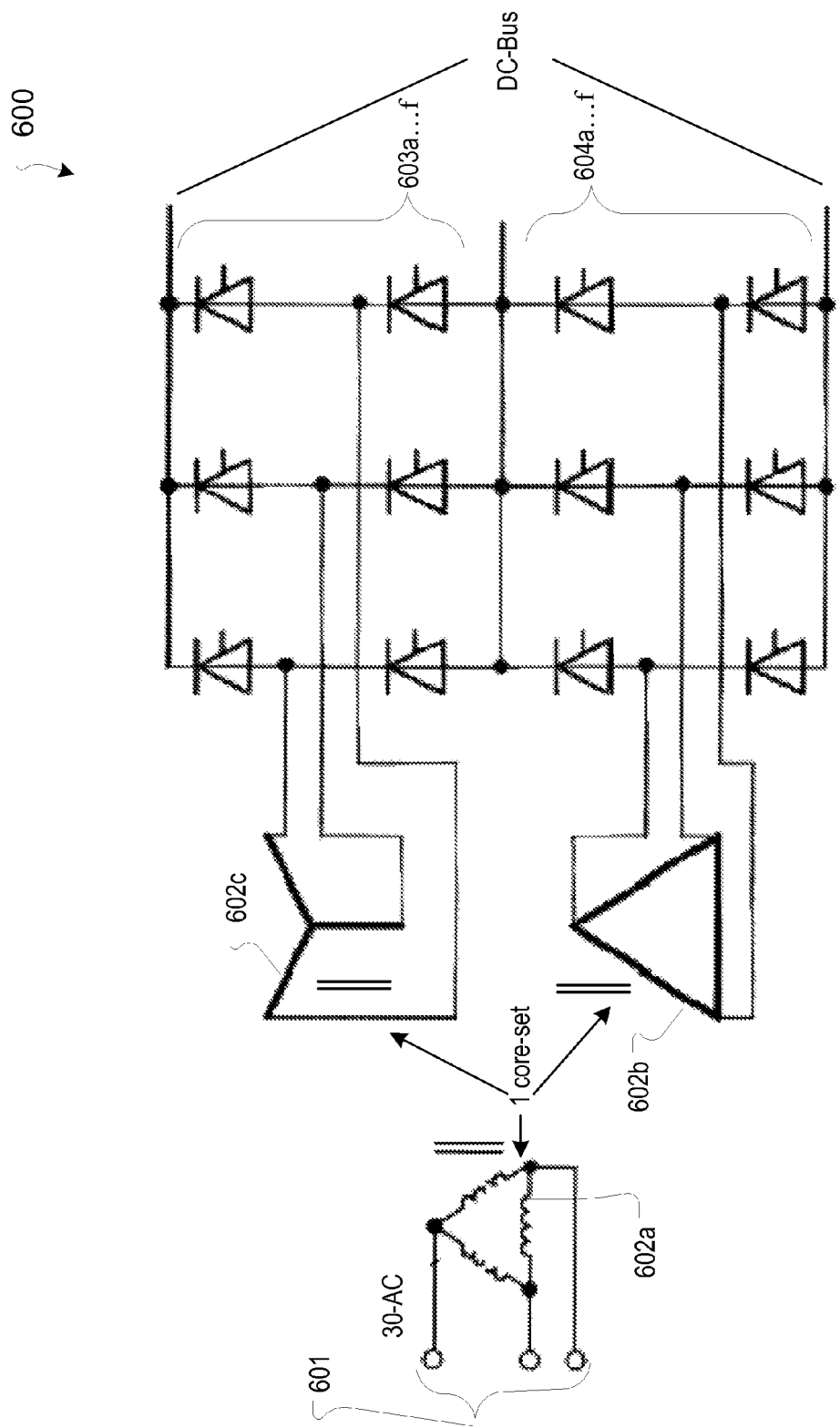
FIG. 6a shows a delta-wye-delta serial configuration of a static inverter.

FIG. 6*a* shows a delta-wye-delta serial configuration of a static inverter 600 that does not require a balancing transformer. Also, as the two sets of switches are in series, the operating DC voltage can be roughly twice in relation to the breakdown voltage of the switches, as in a parallel configuration. Two sets of diodes or SCRs 603*a* . . . *f* and 604*a* . . . *f* are in series. As a result, the voltage is split (not evenly, but typically 1:2), resulting in the desired 12-step AC voltage that is commonly known in static inverters. Clearly visible are the AC sides of the transformer 602 with, all on the same core, delta winding 602*a*, the main winding 602*b*, also a delta winding, and minor winding 602*c*, which is a wye winding. Placing the two sets of inverter switches 603*a* . . . *f* and 604*a* . . . *f* in series obviates the necessity for a balancing transformer. Alternating current is delivered at connection point 601.

Figure 6B:
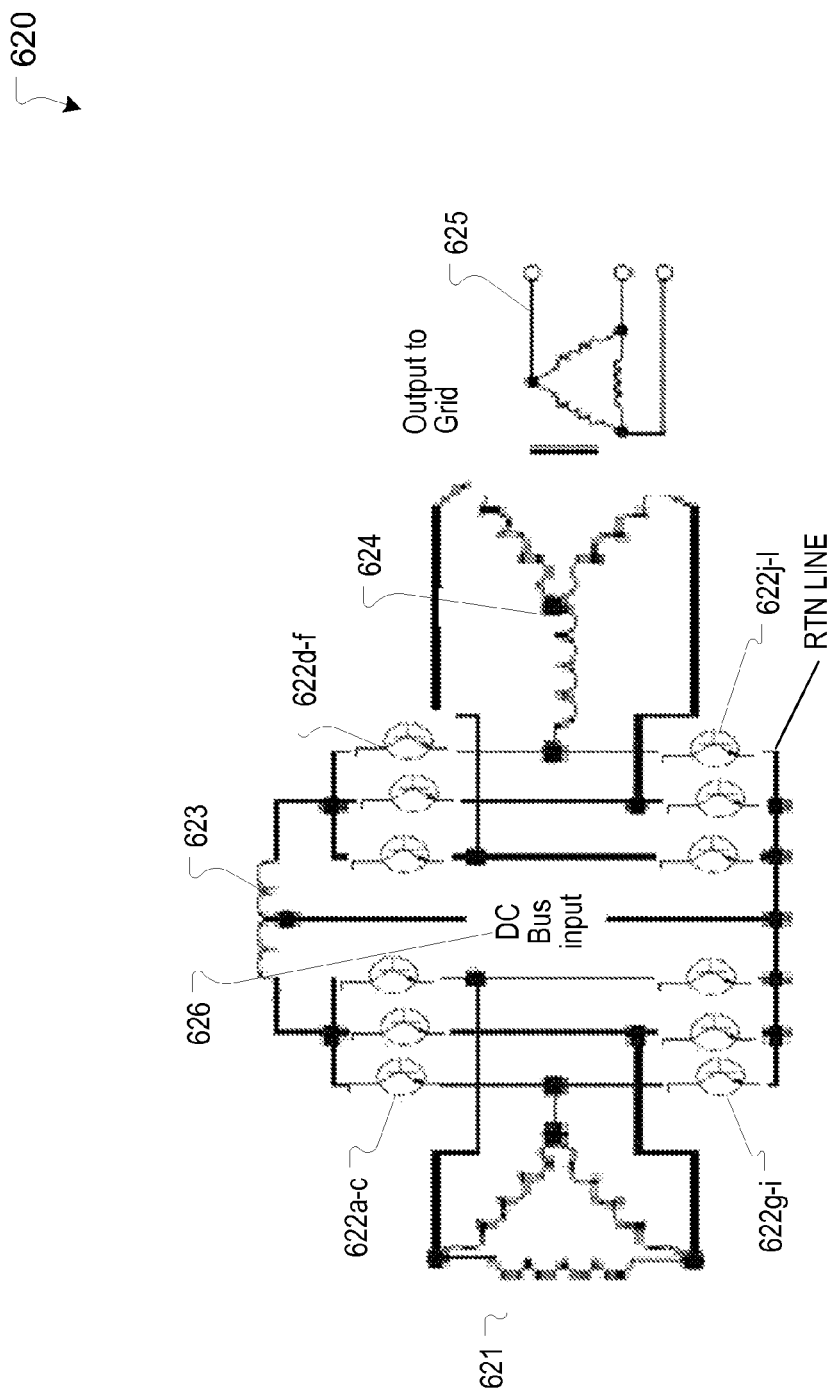
FIG. 6b shows a configuration of a static inverter/rectifier.

FIG. 6*b* shows a different view of a configuration of a static inverter/rectifier 620. Shown is the DC bus 626, the two DC side windings 621 and 624, as well as AC side windings 625 (all on same core), switches 622*a* . . . *l* and balancing transformer 623.

Figure 7:
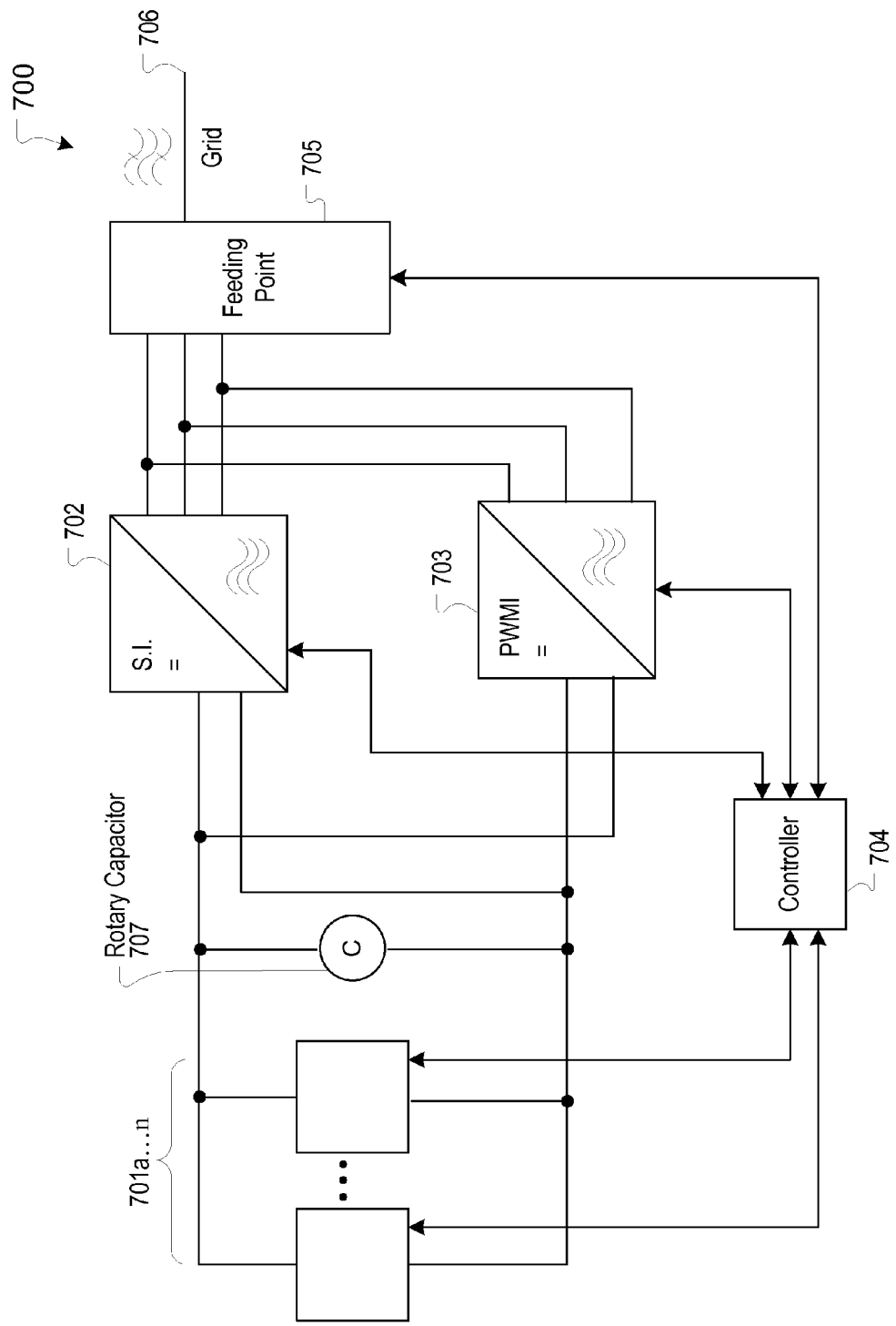
FIG. 7 shows an embodiment of a variable energy generation system with a combination of a static inverter and a pulse width modulation inverter.

FIG. 7 shows an exemplary high-level overview of a complete variable DC power generation and AC conversion system 700, according to one aspect of the system disclosed herein. Controller 704 interacts with multiple energy-producing units 701*a* . . . *n* such as, for example, a multi-unit solar pole, or a windmill, to maintain the desired voltage on the bus. Also shown is an optional rotary capacitor 707, which in this case may be some kind of a motor with a fly wheel. In such a rotary capacitor, the field current may be used to control addition or reduction of energy and thus to stabilize the bus more efficiently and/or cost effectively in some cases than an actual capacitor, depending on the size of the system. In smaller systems, typically, standard capacitors are used. Static inverter 702 inverts DC energy to three-phase power and connects to feeding point 705, and thence to the grid. An additional pulse width modulation inverter (PWMI) 703 corrects the power factor error generated by the static inverter using the 12-pulse generation method. Also, the additional power with modulation in high-frequency inverter 703 runs on higher frequency as it runs on lower power. In some cases, an additional rotary capacitor or other compensation capacitor may be required at grid connection point 705 before the energy is fed into the grid 706.

In FIG. 7, the static inverter 702 is connected in parallel with the pulse width modulation inverter 703. The static inverter 702 and the pulse width modulation inverter 703 both receive DC input from the bus to which the rotary capacitor 707 is connected. The static inverter 702 and the pulse width modulation inverter 703 both output alternating current power to the feeding point 705. The pulse width modulation inverter is configured to correct the power factor error in the output of the static inverter 702 and/or to reduce the ripple 411 in the output of the static inverter 702.

In one embodiment, the controller 704 is configured to coordinate the two inverters so that the output power has a proper waveform. The converter 704, or a separate controller, is connected in one embodiment to the feeding point 705 to insure that the combined output power from the static inverter 702 and the pulse width modulation inverter 703 is compatible with the grid 706.

In one embodiment, the controller 704 is configured to monitor the power factor and/or the ripple 411 in the output to the feeding point 705. The controller 704 controls the operations of the pulse width modulation inverter 703 and/or the static inverter 702 to reduce the error in the power factor and/or the ripple 411 that are in the power provided to the feeding power 705.

In one embodiment, the controller 704 is configured to detect the ripple 411 in the output of the static inverter 702 and adjust the operation of the pulse width modulation inverter 703 to reduce the ripple when the output of the pulse width modulation inverter 703 is combined with the output of the static inverter 702.

In one embodiment, the controller 704 is configured to synchronize the operations of the static inverter 702 and the pulse width modulation inverter 703 according to predetermined parameters, such as frequency, phase offset, etc., to reduce increase the power factor and/or reduce the ripple in the combined output provided to the feeding point.

In one embodiment, the controller 704 is configured to adjust the synchronization of the operations of the static inverter 702 and the pulse width modulation inverter 703, e.g., by adjusting frequency, phase offset, etc., to search for an optimized operation point that increases the power factor and/or reduce the ripple in the combined output provided to the feeding point 705. For example, the controller 704 is in one embodiment configured to operate the statistic inverter at a first state, adjust the operating parameter of the pulse width modulation inverter 703 while monitoring the change in the power factor in the combined output provided to the feeding point 705. The adjustment is made in a direction to improve the power factor.

In one embodiment, the pulse width modulation inverter 703 is configured to convert a portion of the power provided to the feeding point 705 in a magnitude that correspond to the ripple 411 in the output of the static inverter 702. Thus, the output of the pulse width modulation inverter 703 is sufficient to correct the power factor, while the majority of the power provided to the feeding point 705 is converted by the static inverter to take advantage of the general benefit of the static inverter over the pulse width modulation inverter (e.g., better efficiency, higher operation power, etc.).

Further details and examples of correcting a power factor error and creating a proper waveform are discussed in U.S. Patent Application Publication No. 2010/0332047, published on Dec. 30, 2010 and entitled "Systems and Methods for Distributed Power Factor Correction and Phase Balancing," the disclosure of which is incorporated herein by reference.

In FIG. 7, the input power for the static inverter 702 and the pulse width modulation inverter 703 originates with variable collecting unit(s) that may be solar panels, solar poles, wind power collectors, or other variable or intermittent power collecting unit(s) such as tidal power generators. String convertor(s) collect power from respective unit(s) and output direct current power to a bus that provides the power in direct current to the inverters 702 and 703. In one embodiment, the controller 704 further connects to the string converter(s) 111a . . . n to coordinate a conversion of the power for compatibility on the bus. In one embodiment, a rotary capacitor 707, or other type of capacitor, is connected to the bus.

In one embodiment, a static inverter as discussed in connection with FIGS. 1 to 6b is used as the statistic inverter 702 in FIG. 7.

Figure 8:
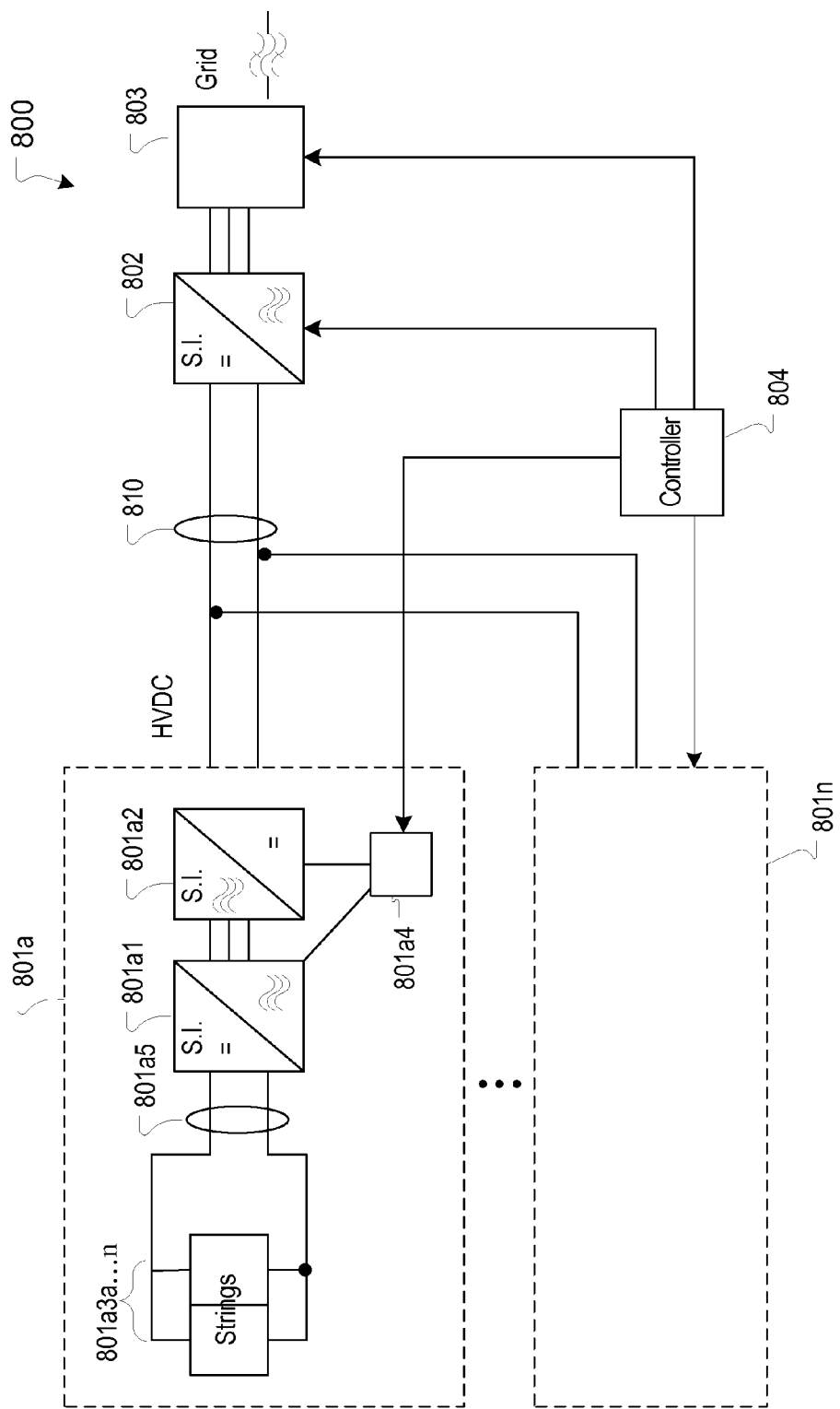
FIG. 8 shows an embodiment of a variable energy generation system with multiple static inverters.

FIG. 8 shows a system 800 similar to system 700, wherein each energy production unit, such as, for example, a solar power pole, wind generator, etc. generates a variable, controlled voltage. In exemplary energy production unit 801a, two back-to-back static inverters 801a1 and 801a2 convert the variable DC voltage, provided by the strings 801a3a . . . n, first into an alternating current, then back into a high-voltage direct current (HVDC), used for a high-voltage transmission line 810. At the end of transmission line 810 an additional static inverter 802 inverts the power into three-phase AC, which is then is then fed into the grid at point 803. Controller 804 interfaces between the grid measurement, the master static inverter 802, and the power generation units at the far end, to balance the voltage on the local DC buses 801a5 that are fed into the internal primary and secondary static inverters 801a1 and 801a2. Additional energy production units 801a . . . n could be, for example, a multi-unit solar pole, or a windmill, or any other variable-power generation unit.

In one embodiment, a pulse width modulation inverter 703 in parallel with the statistic inverter 701 to correct power factor and/or reduce ripple in a way as illustrated in FIG. 7.

In one embodiment, a pulse width modulation inverter 703 in parallel with the statistic inverter 801 to correct power factor and/or reduce ripple in a way as illustrated in FIG. 7.

The claims included herein include several embodiments. One embodiment involves collecting energy from variable energy sources such as solar or wind energy, by strings of collectors (for example photovoltaic cells or panels, or wind turbines) as managed by string converters and controller(s). Then compatible electrical energy is transported on a bus to a static inverter including a transformer (such as a delta-wye-delta transformer 122) and a balance transformer 121. The static inverter outputs alternating current at a given voltage. The controller(s) monitor voltage phase on a grid and manages the static inverter so that the alternating current is compatible with grid current.

Another embodiment also involves collecting energy from variable energy sources. In this instance, the topology of the system includes both a static inverter and a pulse width modulation inverter. Current flows through the static inverter and the pulse width inverter to a feeding point and then onto a grid.

Yet another embodiment again involves collecting energy from variable energy sources. Current flows into a static inverter to convert direct current into alternating current. From that point, the alternating current flows into a second static inverter to convert the alternating current into high voltage direct current which is transported on a high voltage direct current transmission line to a master static inverter which in turn converts the direct current into alternating current suitable for transmission via a grid.

While the particular system and apparatus for the use of static inverters in variable energy generation environments as herein shown and described in detail, is fully capable of attaining the above-described objects, it is to be understood that it is the presently preferred embodiment, and is thus representative of the subject matter which is broadly contemplated, that the scope of the disclosure fully encompasses other embodiments which can become obvious to those skilled in the art, and that the scope of the disclosure is accordingly to be limited by nothing other than the appended claims, in which reference to an element in the singular means "at least one." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device to address each and every problem sought to be solved in the disclosure, for it to be encompassed by the present claims. Furthermore, no element or component in the present disclosure is intended to be dedicated to the public, regardless of whether the element or component is explicitly recited in the claims.

What is claimed is:

1. An energy generation system comprising:
   a static inverter to provide an alternating current power to a feeding point; and
   a pulse width modulation inverter connected in parallel with the static inverter to correct a power factor error in the alternating current power provided by the static inverter.

2. The system of claim 1, further comprising a controller in communication with the static inverter and the pulse width modulation inverter wherein the controller coordinates the static inverter and the pulse width modulation inverter to correct a waveform of the alternating current power.

3. The system of claim 1, further comprising a controller in communication with the feeding point to coordinate the alternating current power with a grid.

4. The system of claim 1, wherein the static inverter inverts a direct current power to a three-phase form of the alternating current power.

5. The system of claim 1, further comprising a bus to supply a direct current power to the static inverter and the pulse width modulation inverter.

6. The system of claim 5, further comprising:
   a plurality of variable energy collecting units to produce respective direct current power outputs; and
   a plurality of string converters to receive the respective outputs;
   wherein the string converters supply the respective outputs to the bus in the form of the direct current power.

7. The system of claim 6, wherein the units are selected from the group consisting of one or more of solar panels, solar poles, and wind power collectors, or any combination thereof.

8. The system of claim 5, further comprising:
   one or more variable energy collecting units to produce respective direct current power outputs;
   one or more respective string converters to receive the respective outputs; and
   a controller in communication with the string converters to enable a conversion of the respective outputs to compatible outputs that are compatible with each other on the bus;
   wherein the string converters supply the compatible outputs to the bus in the form of the direct current power.

9. The system of claim 8, wherein the units are selected from the group consisting of solar panels, solar poles, wind power collectors, and any combination thereof.

10. The system of claim 5, further comprising a capacitor in electrical communication with the bus.

11. The system of claim 10, wherein the capacitor is a rotary capacitor.

12. A method for converting energy comprising:
providing, via a static inverter, an alternating current power to a feeding point; and
correcting, via a pulse width modulation inverter connected in parallel with the static inverter, a power factor error in the alternating current power provided by the static inverter.

13. The method of claim 12, further comprising coordinating, via a controller in communication with the static inverter and pulse width modulation inverter, the static inverter and the pulse width modulation inverter, to correct a waveform of the alternating current power.

14. The method of claim 12, further comprising coordinating the alternating current power with a grid via a controller in communication with the feeding point.

15. The method of claim 12, wherein the static inverter inverts a direct current power to a three-phase form of the alternating current power.

16. The method of claim 12, further comprising supplying a direct current power to the static inverter and the pulse width modulation inverter via a bus.

17. The method of claim 16, further comprising:
producing via one or more variable energy collecting units respective direct current power outputs; and
receiving via one or more respective string converters the respective outputs;
wherein the string converters supply the respective outputs to the bus in the form of the direct current power.

18. The method of claim 16, further comprising:
producing via one or more variable energy collecting units respective direct current power outputs;
receiving via one or more respective string converters the respective outputs; and
instructing, via a controller in communication with the string converters, the one or more respective string converters to convert the respective outputs to compatible outputs that are compatible with each other on the bus.

19. The method of claim 16, further comprising a capacitor in electrical communication with the bus.

20. The method of claim 19, wherein the capacitor is a rotary capacitor.

\* \* \* \* \*